United States Patent
Griffith et al.

(10) Patent No.: US 6,524,384 B2
(45) Date of Patent: Feb. 25, 2003

(54) OIL-BASED SETTABLE SPOTTING FLUID

(75) Inventors: James E. Griffith, Duncan, OK (US);
Ricky A. Cox, Comanche, OK (US);
Jiten Chatterji, Duncan, OK (US);
John L. Dennis, Jr., Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/955,000

(22) Filed: Sep. 18, 2001

(65) Prior Publication Data

US 2002/0035041 A1 Mar. 21, 2002

Related U.S. Application Data

(62) Division of application No. 09/626,374, filed on Jul. 26, 2000, now Pat. No. 6,315,042.

(51) Int. Cl.$^7$ ............................................. C04B 18/00
(52) U.S. Cl. ..................... 106/705; 106/708; 106/710; 106/792; 106/794; 166/293; 507/928
(58) Field of Search ................................ 166/292, 293; 507/136, 139, 140, 145, 928; 106/705, 708, 710, 792, 794

(56) References Cited

U.S. PATENT DOCUMENTS

| | | | | |
|---|---|---|---|---|
| 2,219,325 A | 10/1940 | Maness | ................. | 166/21 |
| 2,815,294 A | 12/1957 | Havelin et al. | ........... | 106/118 |
| 2,848,051 A | 8/1958 | Williams | ................. | 166/28 |
| 3,145,774 A | 8/1964 | Patchen | | |
| 3,557,876 A | 1/1971 | Tragesser | ................. | 166/292 |
| 3,625,286 A | 12/1971 | Parker | ................. | 166/291 |
| 3,863,718 A | 2/1975 | Bruist | ................. | 166/285 |
| 3,865,601 A | 2/1975 | Serafin et al. | | |
| 4,210,457 A | 7/1980 | Dodson et al. | ............ | 106/97 |
| RE31,190 E | 3/1983 | Detroit et al. | ............ | 166/293 |
| 4,555,269 A | 11/1985 | Rao et al. | ................. | 106/90 |
| 4,671,357 A | 6/1987 | Binder, Jr. | ............ | 166/291 |
| 4,676,317 A | 6/1987 | Fry et al. | ................. | 166/293 |
| 4,772,330 A | 9/1988 | Kobayashi et al. | ......... | 106/400 |
| 4,924,942 A | 5/1990 | Shen | ................. | 166/291 |
| 4,997,484 A | 3/1991 | Gravitt et al. | ............ | 106/708 |
| 5,018,906 A | 5/1991 | Bonier-Sahuc | ............ | 405/263 |
| 5,028,271 A | 7/1991 | Huddleston et al. | ........ | 106/720 |
| 5,213,160 A | 5/1993 | Nahm et al. | ............ | 166/293 |
| 5,295,543 A | 3/1994 | Terry et al. | ............ | 166/293 |
| 5,327,968 A | 7/1994 | Onan et al. | ............ | 166/293 |
| 5,337,824 A | 8/1994 | Cowan | ................. | 166/293 |
| 5,355,955 A | 10/1994 | Rodrigues et al. | ......... | 166/293 |
| 5,383,521 A | 1/1995 | Onan et al. | ............ | 166/293 |
| 5,458,195 A | 10/1995 | Totten et al. | ............ | 166/293 |
| 5,464,060 A | 11/1995 | Hale et al. | ............ | 166/293 |
| 5,472,051 A | 12/1995 | Brothers | ................. | 166/293 |
| 5,499,677 A | 3/1996 | Cowan | | |
| 5,501,277 A | 3/1996 | Onan et al. | ............ | 166/293 |
| 5,555,937 A | 9/1996 | Fisk, Jr. et al. | ............ | 166/301 |
| 5,585,333 A | 12/1996 | Dahl et al. | ............ | 507/103 |
| 5,711,383 A | 1/1998 | Terry et al. | ............ | 175/72 |
| 5,716,910 A | * 2/1998 | Totten et al. | ............ | 507/102 |
| 5,851,960 A | * 12/1998 | Totten et al. | ............ | 507/118 |
| 5,909,774 A | 6/1999 | Griffith et al. | ............ | 166/312 |
| 5,988,279 A | 11/1999 | Udarbe et al. | ............ | 166/293 |
| 6,138,759 A | 10/2000 | Chatterji et al. | ............ | 166/293 |
| 6,271,181 B1 | 8/2001 | Chatterji et al. | | |

* cited by examiner

*Primary Examiner*—Paul Marcantoni
(74) *Attorney, Agent, or Firm*—Craig W. Roddy; C. Clark Dougherty, Jr.

(57) ABSTRACT

Oil-based settable spotting fluid compositions and methods of using the compositions are provided. The oil-based settable spotting fluid compositions are basically comprised of oil, an emulsifying surfactant for emulsifying the oil with water whereby an oil-external emulsion is formed, a de-emulsifying surfactant which in time de-emulsifies said oil-external emulsion when the emulsion is contacted with external water, a hydraulic settable component selected from the group consisting of ASTM Class C or the equivalent fly ash and ASTM Class F or the equivalent fly ash together with a source of calcium and water selected from the group consisting of fresh water and salt water.

20 Claims, No Drawings

OIL-BASED SETTABLE SPOTTING FLUID

CROSS-REFERENCE TO RELATED APPLICATION

This is a divisional of application Ser. No. 09/626,374 filed on Jul. 26, 2000, now U.S. Pat. No. 6,315,042.

BACKGROUND OF THE INVENTION

1. Field of the Invention

This invention relates to oil-based settable spotting fluid compositions for use in cementing wells and methods of using the compositions.

2. Description of the Prior Art

Hydraulic cement compositions are commonly utilized in the construction of oil and gas wells. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

A variety of drilling fluids are used in drilling wells. Oil-based drilling fluids are commonly used in applications where the permeabilities of producing formations would be damaged if the formations were contacted by water-based drilling fluids. However, it has heretofore been common place in the industry to use water-based settable spotting fluids which are incompatible with the oil-based drilling fluids and often cause well bore stability problems and damage to the permeability of producing formations.

During the drilling of a well bore, the drilling fluid used is circulated through the drill pipe and drill bit and then upwardly through the well bore to the surface. The drilling fluid functions to lubricate the drill bit and carry cuttings to the surface where the cuttings and gas are removed from the drilling fluid. While drilling fluids are not settable, i.e., they do not set into hard impermeable sealing masses when static, drilling fluids increase in gel strength over time. Typically, after a well bore is drilled to total depth, the drill pipe and drill bit are withdrawn from the well bore and the drilling fluid is left in the well bore to provide hydrostatic pressure on permeable formations penetrated by the well bore thereby preventing the flow of formation fluids into the well bore.

The next operation in completing the well bore usually involves running a pipe string, e.g., casing, into the well bore. Depending upon the depth of the well bore and whether or not problems are encountered in running the pipe string therein, the drilling fluid may remain relatively static in the well bore for a time period up to 2 weeks. During that time, the stagnate drilling fluid progressively increases in gel strength whereby portions of the drilling fluid in the well bore become increasingly difficult to displace.

After the pipe string has been run in the well bore, the next operation performed is usually primary cementing. That is, the pipe string disposed in the well bore is cemented by pumping a cement composition through the pipe string and into the annulus between the pipe string and the walls of the well bore whereby the drilling fluid in the annulus is displaced therefrom by the cement composition. While a variety of techniques have been developed for improving the displacement of the drilling fluid from the annulus, if the drilling fluid has developed gel strength due to remaining static in the well bore for a long period of time, portions of the drilling fluid in the well bore are bypassed by the cement composition. Since the drilling fluid is not settable, i.e., it does not set into a rigid mass, formation fluids enter and flow in the well bore which is highly undesirable.

Heretofore, settable spotting fluid compositions have been developed and used in wells for various purposes including the early displacement of drilling fluids from well bores. However, as mentioned, the settable spotting fluids have been water based and have included blast furnace slag and other hydraulic components which slowly set at relatively low temperatures, i.e., temperatures less than about 90° F. Also, slag-containing settable spotting fluids are intolerant to cement composition contamination, i.e., if well cement mixes with such spotting fluids, the spotting fluids prematurely set. To prevent a slag-containing spotting fluid from prematurely setting, a very strong set retarder must be added to the spotting fluid and the spotting fluid must be separated from the cement composition by a spacer fluid. If intermixing between the cement composition and the set retarded spotting fluid occurs, the cement composition may be prevented from setting by the strong set retarder in the spotting fluid.

Thus, there are needs for oil-based settable spotting fluid compositions which can be utilized in wells drilled with oil-based drilling fluids and avoid well cementing problems of the types described above at subterranean temperatures above 90° F.

SUMMARY OF THE INVENTION

By the present invention, oil-based settable spotting fluid compositions and methods of using the compositions in well cementing at temperatures up to about 200° F. are provided which meet the above described needs and overcome the deficiencies of the prior art. The oil-based settable spotting fluid compositions of this invention are basically comprised of oil, an emulsifying surfactant for emulsifying the oil with water whereby an oil-external emulsion is formed, a de-emulsifying surfactant which in time de-emulsifies the oil-external emulsion when the emulsion is contacted with external water, a hydraulic settable component selected from the group consisting of ASTM Class C or the equivalent fly ash and ASTM Class F or the equivalent fly ash together with a source of calcium, and water selected from the group consisting of fresh water and salt water present in an amount sufficient to form a slurry having a density in the range of from about 12 to about 15 pounds per gallon.

The oil-based settable spotting fluid compositions of this invention are compatible with oil-based drilling fluids. The oil-based spotting fluids are also tolerant to well cement contamination and as a result, the use of set retarders is not required. Further, when displacing an oil-based settable spotting fluid composition of this invention with a well cement composition, a spacer between the spotting fluid and the well cement composition does not have to be utilized, and there is no need to utilize a spacer for improving the spotting fluid displacement since any bypassed spotting fluid will set with time.

The methods of this invention for cementing a pipe string such as casing in a well bore containing oil-based drilling fluid with a cement composition are basically comprised of the steps of preparing an oil-based settable spotting fluid composition of this invention, pumping the settable spotting fluid composition into the well bore to displace at least a portion of the oil-based drilling fluid from the well bore thereby preventing the drilling fluid from remaining in at least a portion of the well bore and progressively increasing in gel strength over time therein, running the pipe string to be cemented into the well bore whereby the pipe string and well bore are at least partially filled with the oil-based settable spotting fluid, pumping and displacing the cement composition through the pipe string and into the annulus between the pipe string and the walls of the well bore whereby the oil-based drilling fluid and the oil-based settable spotting fluid composition in the pipe string and in the annulus are displaced therefrom except for portions of the oil-based settable spotting fluid composition which may remain in fractures or other non-displaced areas in the well bore, and allowing the cementing composition in the annulus and any settable spotting fluid composition remaining in the fractures or other non-displaced areas to set into a hard impermeable mass therein.

It is, therefore, a general object of the present invention to provide oil-based settable spotting fluid compositions and methods of using the compositions in cementing wells.

Other and further objects, features and advantages of the present invention will be readily apparent to those skilled in the art upon a reading of the description of preferred embodiments which follows.

DESCRIPTION OF PREFERRED EMBODIMENTS

The oil-based settable spotting fluid compositions of this invention for use in cementing wells at temperatures up to about 200° F. are basically comprised of oil, an emulsifying surfactant for emulsifying the oil with water whereby an oil-external emulsion is formed, a de-emulsifying surfactant which in time de-emulsifies the oil-external emulsion when the emulsion is contacted with external water, a hydraulic settable component selected from the group consisting of ASTM Class C or the equivalent fly ash and ASTM Class F or the equivalent fly ash together with a source of calcium, and water selected from the group consisting of fresh water and salt water present in an amount sufficient to form a slurry having a density in the range of from about 12 to about 15 pounds per gallon.

The term "oil-based settable spotting fluid composition (s)" is used herein to mean a fluid which over time will harden into an impermeable mass having sufficient compressive strength to prevent the undesirable entry into and the flow of formation fluids in the well bore, but which will not set for a desired relatively long period of time in the range of from about 2 days to about 2 weeks or more. During this time, a pipe string, e.g., casing, can be placed in the well bore and conventional cementing operations can be completed.

The oil utilized for preparing the oil-based settable spotting fluid compositions of this invention is preferably comprised of one or more long chain mineral oils. A particularly suitable mixture of long chain mineral oils is commercially available under the trade designation "ESCAID 110™" from the Exxon Corporation.

While various emulsifying surfactants for emulsifying the oil with water can be utilized, a particularly suitable such emulsifying surfactant is alkylphenol hydroxypolyoxyethylene which is commercially available under the trade designation "TERGITOL NP-C49™" from Union Carbide Corporation. The emulsifying surfactant utilized is generally present in the oil-based settable spotting fluid of this invention in an amount in the range of from about 0.01% to about 2% by weight of water in the composition, more preferably in the range of from about 0.01% to about 1% and most preferably in an amount of 0.05%.

The de-emulsifying surfactant which de-emulsifies the oil-external emulsion when the emulsion is contacted with external water from the cement composition is preferably an ethoxylated alkyl alcohol glycol ether ethoxylated with from about 3 to about 10 moles of ethylene oxide and wherein the alkyl alcohol has from about 12 to about 16 carbon atoms. Such a de-emulsifying surfactant is commercially available under the trade designation "SURFONIC® L24-7" from Huntsman Petrochemical Co. The de-emulsifying surfactant utilized is generally present in the oil-based settable spotting fluid in an amount in the range of from about 0.01% to about 1% by weight of oil in the composition, more preferably in an amount of from about 0.01% to about 0.5% and most preferably in an amount of 0.024%.

Fly ash is produced by the forced draft combustion of powdered coal. The fly ash which is carried by the flue gases is recovered, for example, by electrostatic precipitators. ASTM Class C or the equivalent fly ash contains both silica and lime and when mixed with water forms a cementitious mixture which sets into a hard impermeable mass, i.e., calcium silicate hydrate. ASTM Class F fly ash does not contain lime, and a source of calcium ion is required for it to form a cementitious composition with water. Generally, lime is mixed with Class F or the equivalent fly ash in an amount in the range of from about 5% to about 50% by weight of the fly ash. Of the two forms of fly ash which are commercially available, i.e., ASTM Class C or ASTM Class F, ASTM Class F together with lime is preferred for use in accordance with the present invention. The fly ash utilized is generally present in an amount in the range of from about 35% to about 85% by weight of oil in the composition, more preferably in an amount of from about 55% to about 65% and most preferably in an amount of about 58.33%. When ASTM Class F fly ash is utilized, hydrated lime is preferably used therewith in a general amount in the range of from about 5% to about 50% by weight of ASTM Class F fly ash in the composition, more preferably in an amount from about 10% to about 20% and most preferably in an amount of 15%.

As mentioned, the water utilized in the oil-based settable spotting fluid compositions of this invention can be fresh water or salt water depending upon the particular density of the composition required. The term "salt water" is used herein to mean unsaturated salt water or saturated salt water including brines and seawater. The water is included in the oil-based settable spotting fluid compositions in an amount sufficient to form a slurry having a density in the range of from about 12 to about 15 pounds per gallon.

In order to prevent foaming when the oil-external emulsion is formed with water, a defoaming agent can optionally be included in the composition of this invention. While various defoaming agents can be used, a preferred defoaming agent is comprised of polypropylene glycol, particulate hydrophobic silica and a liquid diluent. Such a defoaming agent is commercially available under the trade designation "D-AIR 3000 L™" from Halliburton Energy Services Corporation of Duncan, Okla. When used, the defoaming agent is generally present in an amount in the range of from about 0.01% to about 0.1% by weight of water in the composition.

A particularly preferred oil-based settable spotting fluid of this invention for use in cementing wells comprises one or more long chain mineral oils, an emulsifying surfactant for emulsifying the oil with water whereby an oil-external emulsion is formed comprised of alkylphenol hydroxypolyoxyethylene present in an amount in the range of from about 0.01% to about 1% by weight of water in the composition, a de-emulsifying surfactant which in time de-emulsifies the oil-external emulsion when the emulsion is contacted with external water comprised of an ethoxylated alkyl alcohol glycol ether ethoxylated with from about 3 to about 10 moles of ethylene oxide and wherein the alkyl alcohol has from about 12 to about 16 carbon atoms, said de-emulsifying surfactant being present in an amount in the range of from about 0.01% to about 0.5% by weight of oil in the composition, a defoaming agent comprised of polypropylene glycol, particulate hydrophobic silica and a liquid diluent present in an amount in the range of from about 0.01% to about 0.1% by weight of the water in the composition, a hydraulic settable component comprised of ASTM Class F fly ash present in an amount in the range of from about 55% to about 65% by weight of oil in the composition, hydrated lime present in the composition in an amount of about 5% by weight of the hydraulic settable component in the composition and water selected from the group consisting of fresh water and salt water present in an amount sufficient to form a slurry having a density in the range of from about 12 to about 15 pounds per gallon.

In accordance with the methods of the present invention, when a well bore is drilled with an oil-based drilling fluid to total depth and before the drilling fluid in the well bore has had a chance to gain significant gel strength, the drilling fluid is at least partially displaced with the oil-based settable spotting fluid composition of this invention. The oil-based drilling fluid is usually displaced by the oil-based settable spotting fluid composition to a level above those portions of the well bore containing fractures, vugs and other permeable areas or zones. The oil-based spotting fluid composition does not increase in gel strength with time, and it is easily displaced after being static in the well bore for a long period of time, e.g., a time period up to about two weeks. Because the oil-based drilling fluid has not had a chance to increase in gel strength and because the drill pipe includes large diameter drill collars and the like which cause high annular velocity, displacement of the oil-based drilling fluid is achieved by the oil-based settable spotting fluid composition of this invention.

After the well bore is at least partially filled with the oil-based spotting fluid composition, the pipe string to be cemented is run in the well bore. Depending on how much of the drilling fluid has previously been displaced, and if the pipe string is not floated into the well bore while being filled with the oil-based spotting fluid composition, some drilling fluid will remain in the pipe string. When the well cement composition is pumped through the pipe string into the annulus, the oil-based drilling fluid and the oil-based spotting fluid composition in the pipe string and annulus are displaced ahead of the well cement composition. Because the annulus contains the oil-based spotting fluid composition, any drilling fluid entering the annulus will not have time to increase in gel strength therein and will be readily displaced therefrom by the well cement composition. The oil-based settable spotting fluid composition, if any, remaining in fractures or other permeable areas or zones in the well bore after the annulus has been filled with cement will ultimately set thereby preventing the entry or flow of formation fluids in the annulus.

Thus, the methods of this invention for cementing a pipe string in a well bore containing oil-based drilling fluid with a well cement composition are basically comprised of the following steps: (a) preparing an oil-based settable spotting fluid composition of this invention; (b) pumping the oil-based settable spotting fluid composition into the well bore to displace at least a portion of the drilling fluid out of the well bore thereby preventing the oil-based drilling fluid from remaining in fractures or other permeable zones in the well bore and progressively increasing in gel strength over time therein; (c) running the pipe string to be cemented into the well bore whereby the pipe string and well bore are at least partially filled with the settable spotting fluid; (d) pumping and displacing the well cement composition through the pipe string and into the annulus between the pipe string and the walls of the well bore whereby the oil-based drilling fluid and the oil-based settable spotting fluid composition in the pipe string and the annulus are displaced therefrom except for portions of the oil-based settable spotting fluid composition which may remain in fractures or other permeable zones therein; and (e) allowing the well cement composition in the annulus and any oil-based settable spotting fluid composition remaining in the fractures or other permeable zones therein to set into hard impermeable masses therein.

In order to further illustrate the compositions and methods of the present invention, the following example is given.

EXAMPLE

Two oil-based compositions of this invention were prepared by the following procedure. A long chain mineral oil mixture ("ESCAID 110™" from Exxon of Houston, Tex.) was mixed with an emulsifying surfactant ("TERGITOL NP-C49™" from Union Carbide Corp. of Danbury, Conn.). The emulsifying surfactant was added to the oil in an amount of 0.05% by weight of the water.

Hydrated lime was next added to fresh water in the amount given in the Table below, and a de-foaming agent ("D-AIR 3000L™" from Halliburton Energy Services, Inc. of Duncan, Okla.) was added to the water in an amount of 0.1% by weight of the water.

The oil phase and water phase were then combined and vigorously mixed to form the oil-external emulsion. ASTM Class F fly ash was added to the emulsion in an amount of 58.33% by weight of the oil therein, and a de-emulsifying surfactant ("SURFONIC® L24-7" from Huntsman Petrochemical Co. of Houston, Tex.) was added to the emulsion in an amount of 0.024% by weight of the water therein.

The resulting oil-based settable spotting fluid compositions were tested for rheology, gel strength, fluid loss and set time in accordance with the procedures set forth in API Recommended Practices 1013 issued by the American Petroleum Institute of Washington, D.C. The results of the tests are given in the Table below.

TABLE

Properties Of Oil-Based Settable Spotting Fluids

| Test | Amount of Hydrated Lime Dissolved in Water, % by weight of water | |
|---|---|---|
| | 80% | 50% |
| Rheology At 80° F. | | |
| 300 rpm | 252 | 235 |
| 200 rpm | 211 | 198 |

TABLE-continued

Properties Of Oil-Based Settable Spotting Fluids

| Test | Amount of Hydrated Lime Dissolved in Water, % by weight of water | |
|---|---|---|
|  | 80% | 50% |
| 100 rpm | 159 | 149 |
| 6 rpm | 72 | 66 |
| 3 rpm | 65 | 59 |
| Gel Strength At 80° F. | | |
| 10 sec. | 59 | 58 |
| 10 min. | 59 | 61 |
| 30 min. | 67 | 71 |
| Fluid Loss At 80° F. | | |
| cubic centimeters | 5 | 4.5 |
| Set Time At 150° F. | | |
| hours | 48 | 120 |

From the above Table, it can be seen that the oil-based settable spotting fluid compositions of this invention have excellent properties.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. An oil containing settable spotting fluid composition for use in cementing wells comprising:
   oil;
   an emulsifying surfactant for emulsifying said oil with water whereby an oil-external emulsion is formed;
   a de-emulsifying surfactant which de-emulsifies said oil-external emulsion when the emulsion is contacted with external water;
   a hydraulic settable component selected from the group consisting of ASTM Class C fly ash and ASTM Class F fly ash together with hydrated lime; and
   water present in an amount sufficient to form a slurry.

2. The composition of claim 1 wherein said oil is comprised of one or more long chain mineral oils.

3. The composition of claim 1 wherein said emulsifying surfactant is comprised of alkylphenol hydroxypolyoxyethylene and is present in an amount in the range of from about 0.01% to about 2% by weight of water in said composition.

4. The composition of claim 1 wherein said de-emulsifying surfactant is comprised of an ethoxylated alkyl alcohol glycol ether ethoxylated with from about 3 to about 10 moles of ethylene oxide and wherein the alkyl alcohol has from about 12 to about 16 carbon atoms, said de-emulsifying surfactant being present in an amount in the range of from about 0.01% to about 1% by weight of oil in said composition.

5. The composition of claim 1 wherein said hydraulic settable component is comprised of ASTM Class F fly ash together with hydrated lime and said ASTM Class F fly ash is present in an amount in the range of from about 35% to about 85% by weight of oil in said composition.

6. The composition of claim 5 wherein said hydrated lime is present in an amount in the range of from about 5% to about 50% by weight of ASTM Class F fly ash in said composition.

7. The composition of claim 1 wherein said water is selected from the group consisting of fresh water and salt water.

8. The composition of claim 1 wherein said slurry has a density in the range of from about 12 to about 15 pounds per gallon.

9. The composition of claim 1 wherein the composition is a fluid which over time will harden into an impermeable mass having sufficient compressive strength to prevent undesirable entry into and flow of formation fluids into the well bore, but which will not set for at least about 2 days.

10. The composition of claim 1 which further comprises a defoaming agent for defoaming said water when it is mixed with said oil.

11. The composition of claim 10 wherein said defoaming agent is comprised of polypropylene glycol, particulate hydrophobic silica and a liquid diluent, and is present in an amount in the range of from about 0.01% to about 0.1% by weight of water in said composition.

12. An oil containing settable spotting fluid composition for use in cementing wells comprising:
    oil comprised of one or more long chain mineral oils;
    an emulsifying surfactant for emulsifying said oil with water whereby an oil-external emulsion is formed comprised of alkylphenol hydroxypolyoxyethylene and is present in an amount in the range of from about 0.01% to about 2% by weight of water in said composition;
    a de-emulsifying surfactant which de-emulsifies said oil-external emulsion when the emulsion is contacted with external water comprised of an ethoxylated alkyl alcohol glycol ether ethoxylated with from about 3 to about 10 moles of ethylene oxide and wherein the alkyl alcohol has from about 12 to about 16 carbon atoms, said de-emulsifying surfactant being present in an amount in the range of from about 0.01% to about 1% by weight of oil in said composition;
    a hydraulic settable component selected from the group consisting of ASTM Class C fly ash and ASTM Class F fly ash together with hydrated lime; and
    water present in an amount sufficient to form a slurry.

13. The composition of claim 12 wherein said hydraulic settable component is comprised of ASTM Class F fly ash together with hydrated lime and said ASTM Class F fly ash is present in an amount in the range of from about 35% to about 85% by weight of oil in said composition.

14. The composition of claim 13 wherein said hydrated lime is present in an amount in the range of from about 5% to about 50% by weight of ASTM Class F fly ash in said composition.

15. The composition of claim 12 wherein said water is selected from the group consisting of fresh water and salt water.

16. The composition of claim 12 wherein said slurry has a density in the range of from about 12 to about 15 pounds per gallon.

17. The composition of claim 12 wherein the composition is a fluid which over time will harden into an impermeable mass having sufficient compressive strength to prevent undesirable entry into and flow of formation fluids into the well bore, but which will not set for at least about 2 days.

18. The composition of claim 12 which further comprises a defoaming agent for defoaming said water when it is mixed with said oil.

19. The composition of claim 18 wherein said defoaming agent is comprised of polypropylene glycol, particulate hydrophobic silica and a liquid diluent, and is present in an amount in the range of from about 0.01% to about 0.1% by weight of water in said composition.

20. An oil containing settable spotting fluid composition for use in cementing wells comprising:

oil comprised of one or more long chain mineral oils;

an emulsifying surfactant for emulsifying said oil with water whereby an oil-external emulsion is formed comprised of alkylphenol hydroxypolyoxyethylene present in an amount in the range of from about 0.01% to about 1% by weight of water in said composition;

a de-emulsifying surfactant which in time de-emulsifies said oil-external emulsion when the emulsion is contacted with external water comprised of an ethoxylated alkyl alcohol glycol ether ethoxylated with from about 3 to about 10 moles of ethylene oxide and wherein said alkyl alcohol has from about 12 to about 16 carbon atoms, said de-emulsifying surfactant being present in an amount in the range of from about 0.9% to about 0.5% by weight of oil in said composition;

a defoaming agent for defoaming water when it is mixed with said oil comprised of polypropylene glycol, particulate hydrophobic silica and a liquid diluent, said de-foaming agent being present in an amount in the range of from about 0.01% to about 0.1% by weight of the water in said composition;

a hydraulic settable component comprised of ASTM Class F fly ash present in an amount in the range of from about 55% to about 65% by weight of oil in said composition;

hydrated lime present in said composition in an amount of about 5% by weight of said hydraulic settable component in said composition; and water selected from the group consisting of fresh water and salt water present in an amount sufficient to form a slurry having a density in the range of from about 12 to about 15 pounds per gallon.

* * * * *